US006867987B2

(12) United States Patent
Cheng et al.

(10) Patent No.: US 6,867,987 B2
(45) Date of Patent: Mar. 15, 2005

(54) MULTILEVEL INVERTER CONTROL SCHEMES

(75) Inventors: Bing Cheng, West Bloomfield, MI (US); Fengtai Huang, Windsor (CA)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/461,933

(22) Filed: Jun. 13, 2003

(65) Prior Publication Data

US 2004/0252531 A1 Dec. 16, 2004

(51) Int. Cl.[7] .................................................. H02M 1/12
(52) U.S. Cl. ......................................... 363/43; 363/71
(58) Field of Search .............................. 363/43, 71, 65

(56) References Cited

U.S. PATENT DOCUMENTS

| | | | | |
|---|---|---|---|---|
| 4,011,499 A | * | 3/1977 | Betsill et al. ................ | 323/301 |
| 4,032,832 A | * | 6/1977 | Miller ........................... | 363/43 |
| 4,678,986 A | * | 7/1987 | Barthelemy ................. | 323/343 |
| 5,373,433 A | * | 12/1994 | Thomas ........................ | 363/43 |
| 6,021,052 A | | 2/2000 | Unger et al. .................. | 363/26 |

OTHER PUBLICATIONS

Chiasson, J., et al., "Real–Time Computer Control of a Multilevel Converter Using the Mathematical Theory of Resultants," in *Proceedings of the Electrimacs 2002 Conference, 7th International Conference on Modeling and Simulation of Electric Machines, Converters and Systems*, Montreal, Canada, Aug. 18–21, 2002, pp. 1–6.

Huang, F., "Near Optimal Approach in the Design and Implementation of Multilevel Voltage Source Inverters," in *IEE Proceedings* online No. 19990484, Jan. 20, 1999.

* cited by examiner

*Primary Examiner*—Shawn Riley
(74) *Attorney, Agent, or Firm*—Seed IP Law Group PLLC (57) ABSTRACT

A multilevel inverter control system having logic configured to substantially minimize and area between a target waveform and a step signal of a multilevel inverter.

29 Claims, 5 Drawing Sheets

MULTILEVEL INVERTER CONTROL SCHEMES

BACKGROUND OF THE INVENTION

1. Field of the Invention

The present invention relates generally to the field of direct current-to-alternating current (DC/AC) inverters, and more particularly to control schemes for a multilevel inverter.

For a specific application, the number of turns of a winding is fixed.

There are many possible transformer turn ratio configurations. For example, assume the turn ratio between the three transformer output windings (W1, W2, W3) is 9:3:1. The corresponding voltage ratio will also be 9:3:1. With this voltage ratio, assuming the waveform is quarter symmetrical, a possible composition for a quarter cycle may be designed as,

| | Step No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Output | 1 | (3 − 1) | 3 | (3 + 1) | (9 − 3 − 1) | (9 − 3) | (9 − 3 + 1) | (9 − 1) | 9 | (9 + 1) | (9 + 3 − 1) | (9 + 3) | (9 + 3 + 1) |

2. Description of the Related Art

A DC/AC inverter changes DC power into AC power. In a PWM (pulse width modulation) controlled inverter, DC voltage is "chopped" into pulses. The mean value of the pulses follows a sinusoidal waveform. Depending on the power rating of the inverter, the switching frequency can range from a few kHz to a few tens of kHz. There are two main issues amongst many others in design of such an inverter-high switching power loss and high electric magnetic interference (EMI).

One of the alternatives to PWM controlled inverter schemes is to use a multilevel voltage source inverter. A multilevel inverter is a practical approach when an output transformer is required at the load side for safety reasons. Standard products with power ratings of around 5kW are available in the market, such as the SW series from Trace Engineering, 5916 195th St. N.E. Arlington, Wash. USA 98223. The advantages of using a multilevel inverter over a PWM controlled inverter include very good surge capability, high efficiency, good voltage and frequency regulation, and low total harmonic distortion (THD).

Figure 1:
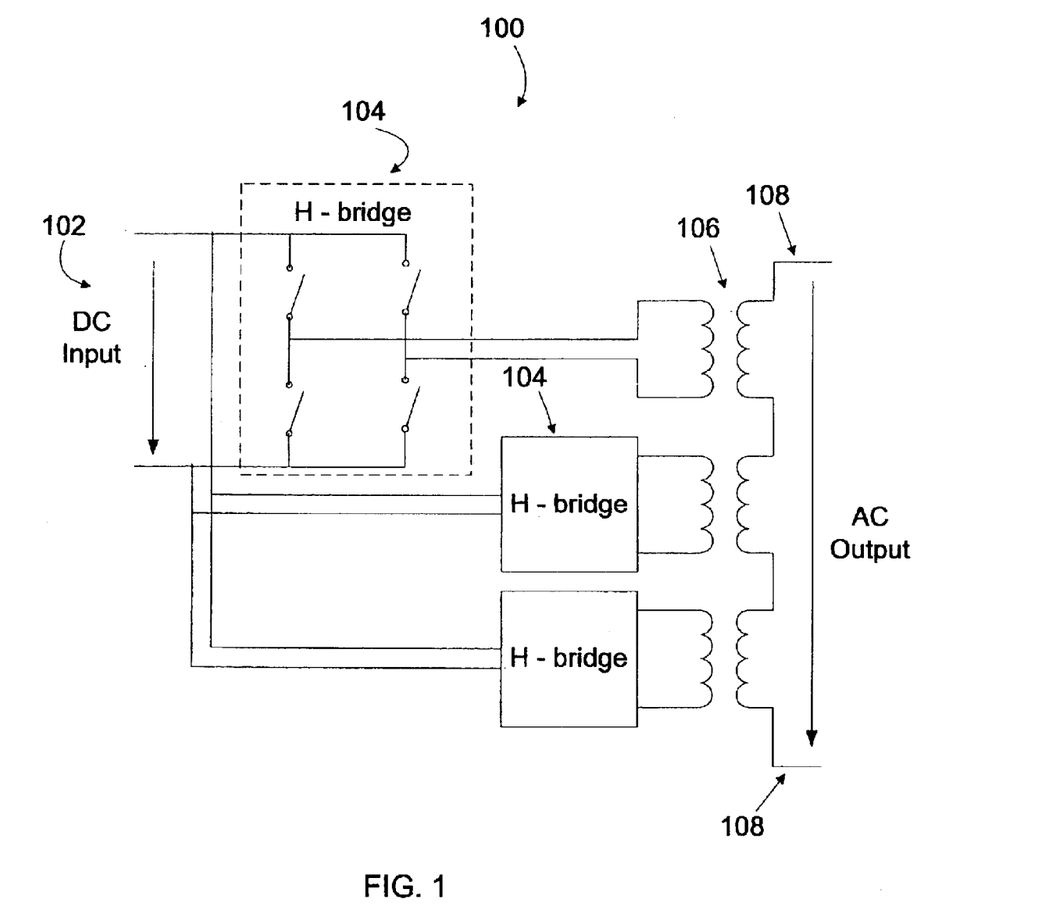
FIG. 1 is a system block diagram of multilevel inverter.

FIG. 1 shows a typical configuration of a multilevel inverter 100. A single DC power source 102 provides power to several low-frequency H-bridge circuits 104 and output transformers 106. The number of low-frequency H-bridge circuits 104 and output transformers 106 is often determined by specific application requirements.

Each H-bridge circuit 104 may generate a zero voltage or a positive/negative step voltage at its output. A series connection 108 of the output transformers 106 provides a multilevel voltage waveform to an AC load (not shown).

Figure 2:
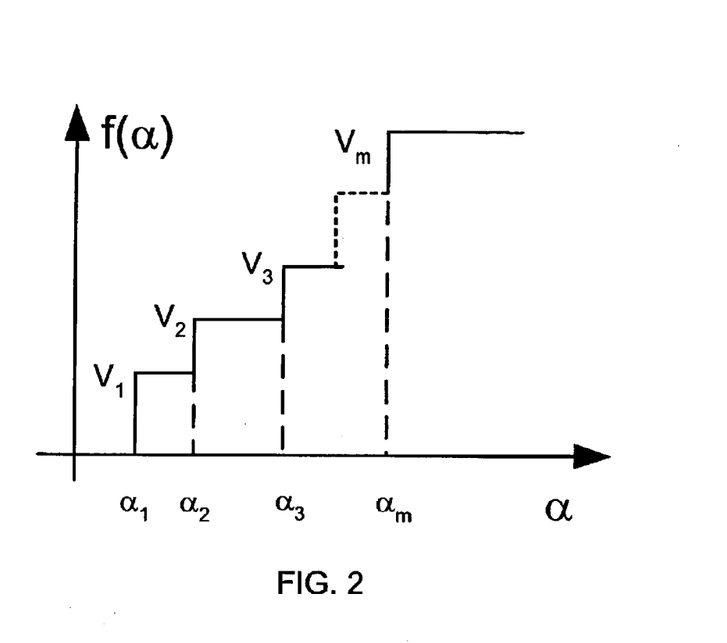
FIG. 2 is a graph of a typical output of multilevel inverters for a quarter cycle.
Figure 4:
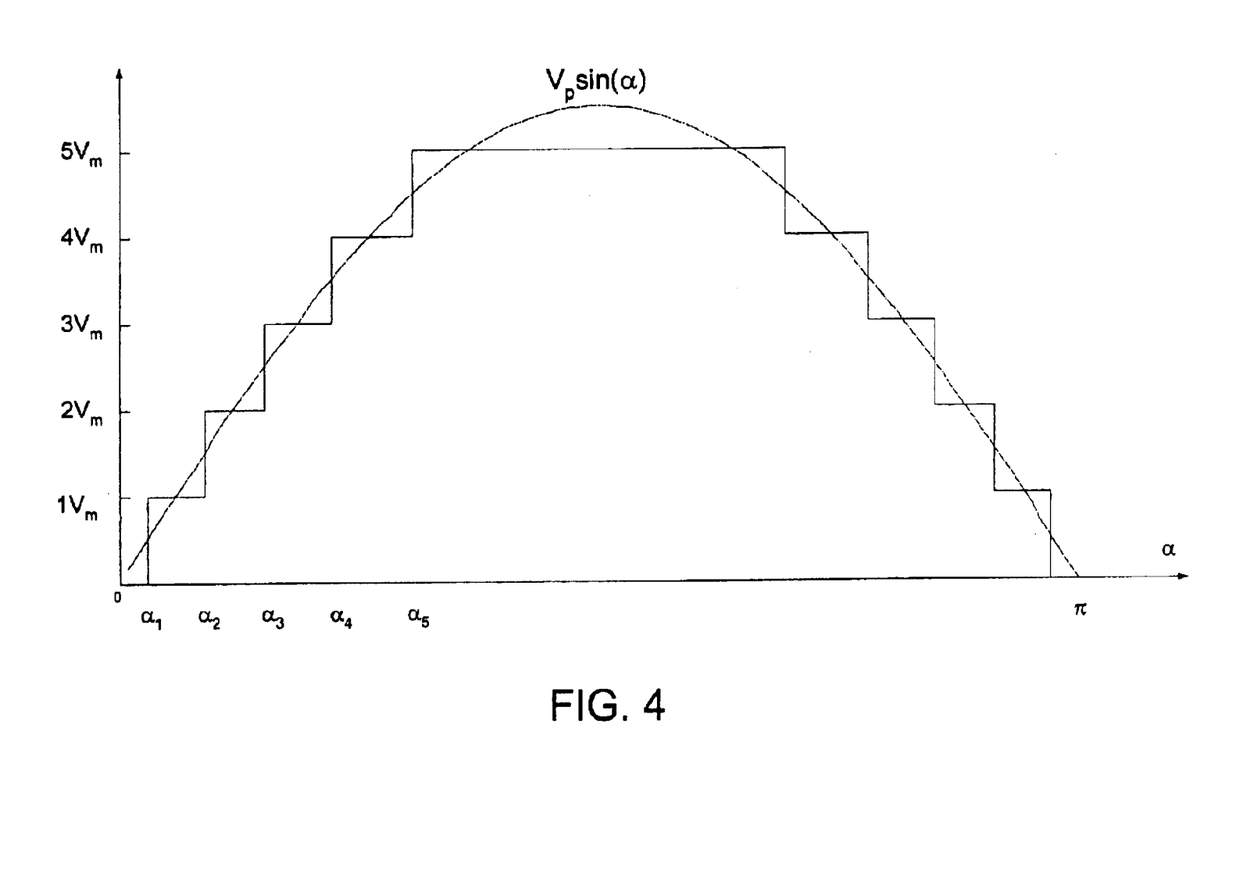
FIG. 4 is a graph of a multilevel inverter output with sub-optimal switching angles.

FIG. 2 shows an output voltage waveform of the multilevel inverter 100, which can be used to generate an approximation of a desired output voltage waveform (see FIG. 4). The voltage "steps" shown in FIG. 2 are associated with energizing the individual output transformers 106 in series connection 108 (FIG. 1) in various and different ways, as explained below. With respect to each individual output transformer 106, the transformer output voltage is proportional to the number of turns of the transformer windings.

At step 1, W3 is energized to positive step voltage, while W1 and W2 are not energized. At step 2, W2 is energized to positive, W3 is energized to negative, while W1 is not energized. Similarly, 13 voltage steps are created in the first half cycle with equalized voltage increase at each step. A maximum of 27 (including zero) voltage steps may be created within each cycle (60 Hz). The number of steps per cycle required is based on the level of DC input voltage and the percentage of output load.

Once the voltage steps are fixed, the times at which the step voltages occur (also referred as switching times) are specified. There are many related art approaches to calculating the switching time. Harmonics elimination and harmonics minimization schemes are two of the optimal approaches.

Detailed optimal calculation of switching time based on the mathematical theory of harmonics elimination and harmonics minimization schemes is complicated and time consuming. See J. Chiasson, etc., *"Real-Time Computer Control of a Multilevel Converter using the Mathematical Theory of Resultants"*, Electrimacs, August 2002. Consequently, practical real time applications of such related art schemes generally use look-up tables containing pre-calculated switching times. At run time, look-up tables are routinely selected to provide desired output voltage with optimized THD.

Because the related art schemes of multilevel inverter control typically use look-up tables at run time, such related art schemes are unresponsive to real time changes involving multilevel inverters. In addition, due to the fact that the control equations are non-linear and numerous, real time application of such equations is not generally practicable. Accordingly, a need exists in the art for a method and system that can provide multilevel inverter control in a fashion that is less computationally intensive than the control used in related art systems. In addition, a need exists in the art for a method and system that can provide multilevel inverter control in a fashion that is responsive to real time changes involving multilevel inverters.

BRIEF SUMMARY OF THE INVENTION

It is a feature and advantage of the present invention to provide a method and system of near real time control of multilevel inverters.

In one embodiment of the present control schemes, a method for controlling a multilevel inverter includes but is not limited to determining at least a peak amplitude of a target waveform; determining a number of discrete steps to achieve the peak amplitude of the target waveform; calculating a plurality of switching angles to substantially minimize an area difference between the target waveform and a step signal of the multilevel inverter, in response to the number of discrete steps; and activating a plurality of voltage sources in response to the plurality of switching angles. In addition to the foregoing, other method embodiments are described in the claims, drawings, and text forming a part of the present application. In certain implementations involving a wide DC input voltage range, the disclosed methods may prove particularly useful.

In one or more various embodiments, related motorized vehicles and/or other systems include but are not limited to circuitry and/or programming for effecting the herein-referenced method embodiment(s); the circuitry and/or programming can be virtually any combination of hardware, software, and/or firmware configured to effect the foregoing-referenced method embodiments depending upon the design choices of the system designer.

In another embodiment of the present control schemes, a multilevel inverter control system includes but is not limited to means for determining at least a peak amplitude of a target waveform; means for determining a number of discrete steps to achieve the peak amplitude of the target waveform; means, responsive to the number of discrete steps, for calculating a plurality of switching angles to substantially minimize an area difference between the target waveform and a step signal of the multilevel inverter; and means for activating a plurality of voltage sources in response to the plurality of switching angles. In addition to the foregoing, other system embodiments are described in the claims, drawings, and text forming a part of the present application. In certain implementations involving a wide DC input voltage range, the disclosed systems may prove particularly useful.

In another embodiment of the present control schemes, a power-related device includes but is not limited to means for determining at least a peak amplitude of a target waveform; means for determining a number of discrete steps to achieve the peak amplitude of the target waveform; means for calculating a plurality of switching angles based on at least one of a frequency and the number of discrete steps to achieve the peak amplitude of the target waveform; and means for activating a plurality of voltage sources in response to the plurality of switching angles. In addition to the foregoing, other system embodiments are described in the claims, drawings, and text forming a part of the present application. In certain implementations involving a wide DC input voltage range, the disclosed systems may prove particularly useful.

In another embodiment of the present control schemes, a multilevel inverter control system includes but is not limited to a step number determination module; and a switch angle determination module having logic configured to substantially minimize an area difference between a target waveform and a step signal of a multilevel inverter. In addition to the foregoing, other system embodiments are described in the claims, drawings, and text forming a part of the present application. In certain implementations involving a wide DC input voltage range, the disclosed systems may prove particularly useful.

In another embodiment of the present control schemes, a multilevel inverter control system includes but is not limited to a switch angle calculation module having logic configured to substantially minimize an area difference between a target waveform and a step signal of a multilevel inverter. In addition to the foregoing, other system embodiments are described in the claims, drawings, and text forming a part of the present application. In certain implementations involving a wide DC input voltage range, the disclosed systems may prove particularly useful.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

DETAILED DESCRIPTION OF THE INVENTION

In the following description, certain specific details are set forth in order to provide a thorough understanding of the various embodiments of the subject matter described herein. However, one skilled in the art will understand that the subject matter described herein may be practiced without these details. In other instances, well-known structures associated with electrical power devices and/or power transfer devices have not been shown or described in detail to avoid unnecessarily obscuring descriptions of the embodiments of the subject matter described herein.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

I. Sub-Optimal Switching Algorithm

FIG. 2 shows a typical output of a quarter cycle waveform of the multilevel inverter 100. For a quarter wave symmetrical odd function shown in FIG. 2, there exist only odd numbers of harmonics, including a fundamental component. A generalized equation is given, $$b_n = \frac{4}{n\pi} \sum_{i=1}^{m} V_i \cos n\alpha_i \quad n = \text{odd} \tag{1}$$

where $b_n$ is the nth harmonic, m is the number of voltage steps per quarter cycle, and $V_i$ is the amplitude of each step voltage increment. See F. Huang, "*NEAR OPTIMAL APPROACH IN THE DESIGN AND IMPLEMENTATION OF MULTILEVEL VOLTAGE SOURCE INVERTERS*", IEE Proceedings, Electr. Power Appl. Vol. 146, No. 6, November 1999, pp. 661–6, hereby incorporated by reference in its entirety.

If all the steps have the same amplitude, $V_m$, then $$b_n = \frac{4V_m}{n\pi} \sum_{i=1}^{m} \cos n\alpha_i \quad n = \text{odd}. \tag{2}$$

The fundamental component (n=1) of the output is $$b_i = \frac{4V_m}{\pi} \sum_{i=1}^{m} \cos \alpha_i. \tag{3}$$

It is clear from equation (2) that for 13 steps, 13 non-linear equations need to be solved in order to find the optimal switching angles $\alpha_i$ at a required fundamental output voltage, $V_1$, and its harmonics $V_i$ (i=3,5. . . ).

Instead of calculating equation (2), a sub-optimal switching algorithm an be used. See F. Huang, "*NEAR OPTIMAL APPROACH IN THE DESIGN AND IMPLEMENTATION OF MULTILEVEL VOLTAGE SOURCE INVERTERS*", IEE Proceedings, Electr. Power Appl. Vol. 146, No. 6, November 1999, pp. 661–6. This sub-optimal switching algorithm is based on the idea of minimizing the area between a desired, or target, sinusoidal multilevel inverter output waveform, and the voltage steps used to approximate the target waveform.

Figure 3:
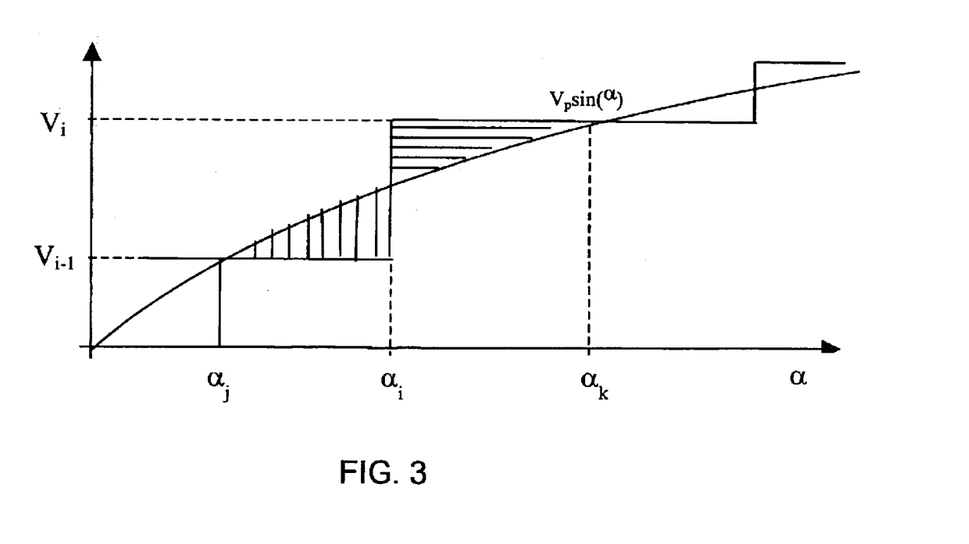
FIG. 3 is a graphical representation of a sub-optimal switching algorithm.

FIG. 3 illustrates the idea of the sub-optimal switching algorithm. The multilevel inverter 100 switches voltage levels at times $\alpha_j$, $\alpha_i$, and $\alpha_k$ in an effort to approximate the desired, or target, waveform $V_p \sin(\alpha)$. In the sub-optimal switching algorithm, the goal is to minimize the area difference between the commanded, or target, sinusoidal signal $V_p \sin(\alpha)$ and the step signal from the multilevel inverter 100. With this algorithm, sub-optimal switching times can be found in a very simplified way.

The area between the two waveforms centered at a step change is shown in FIG. 3 as shaded. Mathematically, this area is expressed as $$F(\alpha_i) = \int_{\alpha_j}^{\alpha_i} [V_p \sin(\alpha) - V_{i-1}] d\alpha + \int_{\alpha_j}^{\alpha_i} [V_i - V_p \sin(\alpha)] d\alpha \tag{4}$$

where $V_p$ is the peak value of the desired (target or command) sine wave, and $V_i$ is the step height value of the $i_{th}$ step. At its minimum, the derivative of the above equation is zero:

$$\frac{d(F(\alpha_i))}{d\alpha_i} = [V_p \sin(\alpha_i) - V_{i-1}] - [V_i - V_p \sin(\alpha_i)] = 0; \text{ or} \tag{5}$$

$$\alpha_i = \sin^{-1}\left(\frac{V_{i-1} + V_i}{2V_p}\right)$$

If the amplitudes of each voltage step are the same, i.e., $V_i - V_{i-1} = V_m$, equation (5) can be simplified to, $$\alpha_i = \sin^{-1}\left(\left(i - \frac{1}{2}\right)\frac{V_m}{V_p}\right) \tag{6}$$

where i=1,2, . . . , m.

Based on the switching angle calculation in (6), FIG. 4 shows a half cycle waveform with five step voltages.

II. Multilevel Inverter Control System Utilizing Sub-Optimal Control Scheme

The control of the multilevel inverter 100 is implemented through two stages of control. The first control stage finds a correct number of voltage steps for a specific range of input DC bus voltages and output voltages. The second control stage fine-tunes the switching angles to compensate, within a fixed number of voltage steps, variations of the input DC bus voltage and output load. A hysteretic controller may be used for the first control stage and a PI (Proportional Integral) controller may be used for the second control stage. With the two stages of control, the output AC voltage follows closely to the commanded, or targeted, input with the variation of the input DC bus voltage.

Figure 5:
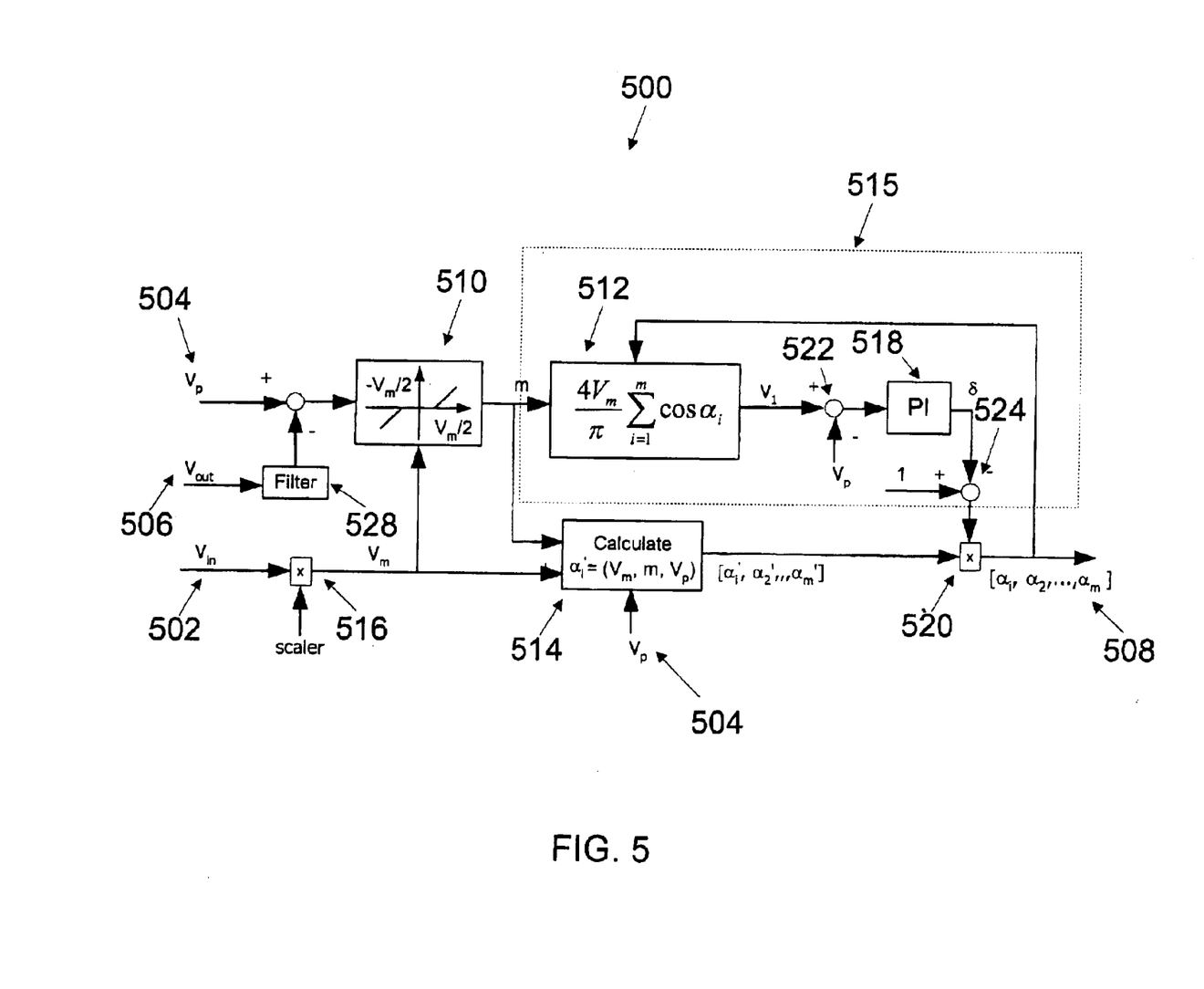
FIG. 5 is a block diagram of a control system according to one illustrated embodiment.

FIG. 5 is a block diagram of a control system 500. The inputs of the system are the input DC bus voltage $V_{in}$ 502, the peak value of the command, or target, voltage $V_p$ 504, and the feedback 506 of the output voltage $V_{OUT}$ (see FIG. 6). The command is the desired sinusoidal output with its peak value $V_p$. The outputs of the controller are the switching angles 508 that are fed to a hardware switching circuit.

A. First Control Stage

The first control stage provides two basic operations (1) determination of the number of steps to be used by the multilevel inverter 100 in order to approximate the command, or target, waveform; and (2) calculation of the switching angles. Consequently, the first control stage comprises a step number determination module and a switch angle determination module. Although the first control stage is described herein as working with the second control stage, it is to be understood that in one embodiment the first control stage can be used separately and independently from the second control stage.

1. Step Number Determination Module

In one embodiment, the step number determination module comprises a hysteretic controller module 510. The hysteretic controller module 510 accepts step amplitude $V_m$. The step amplitude $V_m$ is a function of the transformer windings and the DC bus voltage (see FIG. 1). Once the transformer is selected, the step amplitude $V_m$ is substantially only a function of the input DC bus voltage $V_{in}$ 502. The step amplitude $V_m$ changes proportionally to the input DC bus voltage $V_{in}$ 502. For a specific hardware configuration, a scaler 516 may optionally be used to relate the input DC bus voltage $V_{in}$ 502 and the step amplitude $V_m$.

In order to maintain a consistent multilevel inverter 100 output voltage waveform when the DC bus voltage $V_{in}$ 502 is changing in real time, the number of steps of the multilevel inverter is preferably changed in accordance with real time changes in the input DC bus voltage $V_{in}$ 502. In one embodiment, the selection of the number of steps is implemented with the hysteretic controller module 510. The hysteretic controller module 510 compares the command or target voltage (the desired output voltage), in the form of peak value of the command, or target voltage, $V_p$, with the peak value of the fundamental frequency component of the fed-back actual output voltage $V_{out}$ 506. The fundamental frequency component of the actual output voltage feedback is extracted with a digital filter 528. The digital filter's 528 input is the measured output voltage $V_{out}$ 506 of the multilevel inverter 100 (see FIG. 6). In one embodiment, if the difference between the command, or target, voltage and the feedback signal (measured output of the multilevel inverter 100) is larger than one half of the step amplitude, the step number is increased/decreased by the hysteretic controller module 510.

2. Switch Angle Determination Module

In one embodiment, the switch angle determination module comprises a switch angle calculation module 514 and a switch angle correction factor module 515. The switch angle calculation module 514 calculates the switching angles based on input parameters. The switch angle correction factor module 515 calculates and applies a near real time switching angle correction factor based on the error between the peak value of the command (or target) voltage $V_p$ and the calculated peak value $V_1$ of the fundamental component of the output voltage of the multilevel inverter 100.

a) Switch angle calculation module

As described above, once the input DC bus voltage $V_{in}$ 502 and the command (or target) voltage $V_p$ 504 are determined, the hysteretic controller module 510 receives the step amplitude $V_m$ and the command (or target) voltage $V_p$ 504 and determines the number of steps, m, necessary to achieve the command (or target) voltage $V_p$ 504.

The switch angle calculation module 514 accepts as input the command (or target) voltage $V_P$ 504, the number of steps, m, and the step amplitude $V_m$. In one embodiment, logic within the switch angle calculation module 514 calculates the output switching angles, $\alpha_i'$, using equation (6) above:

$$\alpha_i' = \sin^{-1}\left(\left(i - \frac{1}{2}\right)\frac{V_m}{V_p}\right).$$

As shown in FIG. 5, switching angles are functions of $V_m$ and $V_p$. With m steps, the number of switching angles is m. Although not shown, in another embodiment the switch angle calculation module 514 calculates the output switching angles, $\alpha_i'$, using equation (5) above: $\alpha_i'=\sin_{-1}((V_{i-1}+V_1)/2V_p))$.

In one embodiment of the present control schemes, the switching angles produced by the switch angle calculation module 514 are used to directly control the multilevel inverter 100. In another embodiment of the present control schemes, the switching angles produced by the switch angle calculation module 514 are corrected in near real time in response to a monitored output signal. The switch angle correction factor module 515 calculates and provides the correction of the switching angles.

b) Switch Angle Correction Factor Module

The switch angle correction factor module 515 compensates the calculated switching angles with a correction factor. The purpose of compensation is to increase the output voltage resolution and accuracy.

In one embodiment, the correction factor is generated with a proportional integral (PI) voltage regulator 518 that is described in detail below. Multiplier 520 multiplies the switching angles $\alpha_i'$ by the correction factor to generate actual switching angles $[\alpha_1, \alpha_2, \ldots, \alpha_m]$.

Notice that the switching angles described above are only for the first quadrant, $[0, \pi/2]$, of the cycle. Using the symmetrical property of the sinusoidal signal, the switching angles for the second quadrant are determined as $[\pi\alpha_m, \ldots, \pi-\alpha_2, \pi-\alpha_1]$. The rest of the switching angles over the entire cycle follow the same symmetrical property.

The hysteretic controller module 510 regulates the output voltage by changing the number of voltage steps, m, to compensate for large input DC bus voltage $V_{in}$ 502 changes. Once the number of voltage steps is fixed, or if the variation of the input DC bus voltage $V_{in}$ 502 is within one half of the step amplitude $V_m$, any smaller input DC bus voltage $V_{in}$ 502 changes can be compensated by adjusting the switching angles through use of the correction factor generated by the PI voltage regulator 518.

The PI voltage regulator 518 accepts as input an error signal indicating a difference between the peak value of the command, or target, voltage $V_p$ 504 and a calculated peak value $V_1$ of the fundamental component of a waveform produced with the actual switch angles $[\alpha_1, \alpha_2, \ldots, \alpha_m]$. The fundamental peak value determination unit 512 calculates an expected peak value, $V_1$, of the fundamental component based upon equation (3), described above.

As described above, for a given number of steps m, and for n=1, using equation (3) the fundamental component of the multilevel inverter 100 output is theoretically $$b_1 = \frac{4V_m}{\pi}\sum_{i=1}^{m}\cos\alpha_i.$$

The fundamental peak value determination unit 512 uses the foregoing equation, and the actual switching times $[\alpha_1, \alpha_2, \ldots, _m]$ from the multiplier 520, to calculate the peak value of the fundamental.

Where $\alpha_i$ is a set of switch-on times in the first quarter of the period, therefore, $0<\alpha_i<\pi/2$. Since the function of cosine is a mono-decreasing function in the domain of $[0, \pi/2]$, decreasing $\alpha_i$ will increase the fundamental component, $b_1$, of the inverter output.

The fundamental peak value determination unit 512 outputs the calculated peak value, $V_1$, of the fundamental component to the comparison unit 522. The comparison unit 522 generates an error signal based on a comparison of the calculated peak value $V_1$ of the fundamental component of the output voltage with the peak value of the command (or target) voltage $V_p$. The error signal of comparison unit 522 is accepted as the input of the PI voltage regulator 518.

The output 8 of the PI voltage regulator 512, which in one embodiment ranges from $-1<\delta<1$, is accepted by the summing unit 524 and summed with a unity one. The output of the summing unit 524, the sum (1-δ), is accepted as input to the multiplier 520. The multiplier 520 multiplies the calculated switching angles [α$_1$', α$_2$', . . . , α$_m$'] by the sum (1-δ) to produce the corrected switching angles [α$_1$, α$_2$, . . . , α$_m$]. That is, the sum (1-δ), is used as a correction factor to correct the calculated switching angles [α$_1$', α$_2$', . . . , α$_m$']. The corrected switching angles are [α$_1$, α$_2$, . . . , α$_m$]=(1-δ)[α$_1$', α$_2$', . . . , α$_m$']. In one embodiment, the corrected switching angles are used to control the multilevel inverter 100.

The PI voltage regulator 518 increases the accuracy of the multilevel inverter 100 output within a small variation of input DC bus voltage V$_{in}$ 502. Even though the same correction factor (1-δ) is applied to all the switching angles, the corrected switching angles are very close to the switching angle changing trend calculated using mathematical theory in J. Chiasson, etc., "Real-Time Computer Control of a Multilevel Converter using the Mathematical Theory of Resultants", Electrimacs, August 2002.

Figure 6:
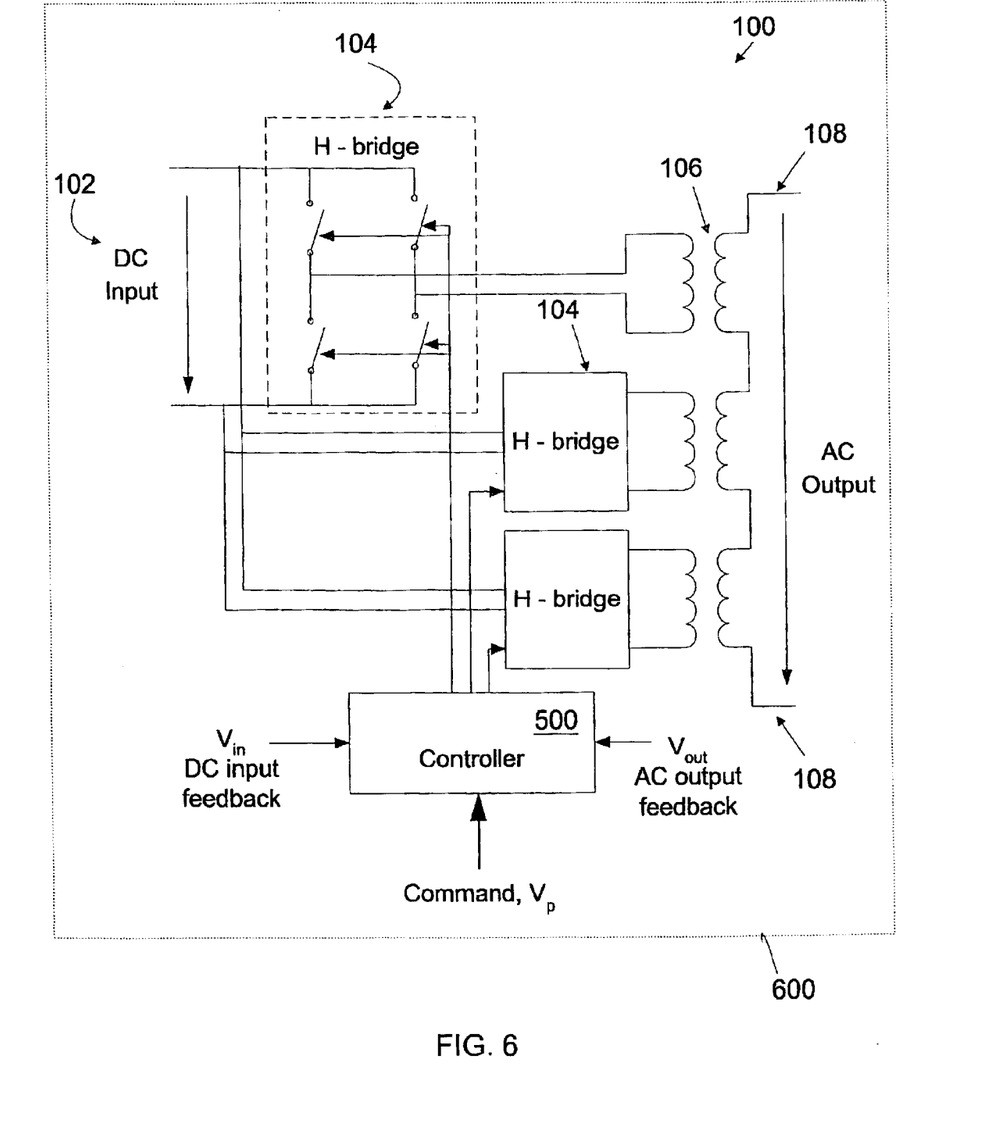
FIG. 6 is a block diagram of a power-related device that includes a multilevel inverter controller according to one embodiment of the present control schemes.

FIG. 6 shows a block diagram of a power-related device 600 having the control system 500 of FIG. 5 interfaced with and controlling the multilevel inverter 100 of FIG. 1. A system designer may interface the control system 500 with the multilevel inverter 100 using conventional techniques. A system designer may incorporate the control system 500 and the multilevel inverter 100 into the power-related device 600 using conventional techniques. The power-related device 600 may be virtually any type of application utilizing a multilevel inverter, such as a motorized vehicle (e.g., including but not limited to an electric vehicle, a hybrid-electric vehicle, and a fuel-cell powered vehicle), a stationary power system, an uninterruptible power supply (UPS), etc.

Those having ordinary skill in the art will recognize that there are several identifiable advantages associated with the above-described schemes. One advantage is that the above-described schemes are such that the source of the input DC bus voltage V$_m$ 502 can be virtually any type of DC voltage source, such as rectified DC, battery, fuel cell, solar array, etc. This is because the above-described schemes are such that they allow the input DC bus voltage V$_{in}$ 502 to vary in a wide range. The above-described schemes also provide additional advantages, including, but not limited to suitability for a wide range of input DC voltage, provision of low THD content and high resolution of the output voltage, as well as ease of implementation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of controlling a multilevel inverter comprising:

determining at least a peak amplitude of a target waveform;

determining a number of discrete steps to achieve the peak amplitude of the target waveform;

calculating a plurality of switching angles to substantially minimize an area difference between the target waveform and a step signal of the multilevel inverter, in response to the number of discrete steps; and activating a plurality of voltage sources in response to the plurality of switching angles.

2. The method of claim 1 wherein the determining at least a peak amplitude of a target waveform comprises:

accepting the peak amplitude with a hysteretic controller.

3. The method of claim 1 wherein the determining a number of discrete steps to achieve the peak amplitude of the target waveform comprises:

filtering an output of the multilevel inverter to extract a fundamental frequency component waveform from the output of the multilevel inverter;

determining a peak amplitude of the fundamental frequency component waveform;

comparing the peak amplitude of the fundamental frequency component waveform against the peak amplitude of the target waveform; and adjusting the number of discrete steps in response to the comparison.

4. The method of claim 1 wherein the calculating a plurality of switching angles to substantially minimize an area difference between the target waveform and a step signal of the multilevel inverter, in response to the number of discrete steps comprises:

calculating each of the plurality of switching angles as $$\alpha'_i = \sin^{-1}\left(\left(i - \frac{1}{2}\right)\frac{V_m}{V_p}\right)$$

where $V_m$ is a discrete voltage step magnitude, $V_p$ is the peak amplitude of the target waveform, and i is an indice ranging from 1 to m, where m is the number of discrete steps.

5. The method of claim 1 wherein the calculating a plurality of switching angles to substantially minimize an area difference between the target waveform and a step-signal of the multilevel inverter in response to the number of discrete steps comprises:

calculating each of the plurality of switching angles as $$\alpha_1' = \sin_{-1}((V_{i-1} + V_1)/2V_p)$$

where $V_i$ are $V_{i-1}$ are discrete voltage step magnitudes indexed against i, $V_p$ is the peak amplitude of the target waveform, and i is an indice ranging from 1 to m, where m is the number of discrete steps.

6. The method of claim 1 wherein the activating a plurality of voltage sources in response to the plurality of switching angles comprises:

energizing a plurality of transformers.

7. The method of claim 1 wherein the calculating a plurality of switching angles to substantially minimize an area difference between the target waveform and a step signal of the multilevel inverter, in response to the number of discrete steps comprises:

calculating a peak amplitude of a fundamental frequency component waveform;

comparing the calculated peak amplitude of the fundamental frequency component waveform against the peak amplitude of the target waveform to obtain an error signal;

generating a correction factor in response to the error signal; and multiplying at least one of the plurality of switching angles by the correction factor.

8. The method of claim 7 wherein the generating a correction factor in response to the error signal comprises:

accepting the error signal into an input of a proportional integral controller; and summing an output of the proportional integral controller with a constant.

9. A multilevel inverter control system, the control system comprising:

means for determining at least a peak amplitude of a target waveform;

means for determining a number of discrete steps to achieve the peak amplitude of the target waveform;

means, responsive to the number of discrete steps, for calculating a plurality of switching angles to substantially minimize an area difference between the target waveform and a step signal of a multilevel inverter; and means for activating a plurality of voltage sources in response to the plurality of switching angles.

10. The control system of claim 9 wherein the means for determining at least a peak amplitude of a target waveform comprises:

means for accepting the peak amplitude.

11. The control system of claim 9 wherein the means for determining a number of discrete steps to achieve the peak amplitude of the target waveform comprises:

means for filtering an output of the multilevel inverter to extract a fundamental frequency component waveform from the output of the multilevel inverter;

means for determining a peak amplitude of the fundamental frequency component waveform;

means for comparing the peak amplitude of the fundamental frequency component waveform against the peak amplitude of the target waveform; and means for adjusting the number of discrete steps in response to the comparison.

12. The control system of claim 9 wherein the means, responsive to the number of discrete steps, for calculating a plurality of switching angles to substantially minimize an area difference between the target waveform and a step signal of the multilevel inverter comprises:

means for calculating each of the plurality of switching angles as $$\alpha_i' = \sin^{-1}\left(\left(i - \frac{1}{2}\right)\frac{V_m}{V_p}\right)$$

where $V_m$ is a discrete voltage step magnitude, $V_p$ is the peak amplitude of the target waveform, and i is an indice ranging from 1 to m, where m is the number of discrete steps.

13. The control system of claim 9 wherein the means, responsive to the number of discrete steps, for calculating a plurality of switching angles to substantially minimize an area difference between the target waveform and a step signal of the multilevel inverter comprises:

means for calculating each of the plurality of switching angles as $$\alpha_i' = \sin_{-1}((V_{i-l} = V_i)2V_p)$$

where $V_i$ are $V_{i-1}$ are discrete voltage step magnitudes indexed against i, $V_P$ is the peak amplitude of the target waveform, and i is an indice ranging from 1 to m, where m is the number of discrete steps.

14. The control system of claim 9 wherein the means for activating a plurality of voltage sources in response to the plurality of switching angles comprises:

means for energizing a plurality of transformers.

15. The control system of claim 9 wherein the means, responsive to the number of discrete steps, for calculating a plurality of switching angles to substantially minimize an area difference between the target waveform and a step signal of the multilevel inverter comprises:

means for calculating a peak amplitude of a fundamental frequency component waveform;

means for comparing the calculated peak amplitude of the fundamental frequency component waveform against the peak amplitude of the target waveform to obtain an error signal;

means for generating a correction factor in response to the error signal; and means for multiplying at least one of the plurality of switching angles by the correction factor.

16. The control system of claim 15 wherein the means for generating a correction factor in response to the error signal comprises:

means for accepting the error signal; and means for summing an output of a proportional integral controller with a constant.

17. The control system of claim 9, further comprising:

a power-related device including the control system.

18. A power-related device comprising:

means for determining at least a peak amplitude of a target waveform;

means for determining a number of discrete steps to achieve the peak amplitude of the target waveform;

means for calculating a plurality of switching angles based on at least one of a frequency and the number of discrete steps to achieve the peak amplitude of the target waveform; and means for activating a plurality of voltage sources in response to the plurality of switching angles.

19. A multilevel inverter control system the control system comprising:

a step number determination module; and a switch angle determination module comprising logic configured to substantially minimize an area difference between a target Waveform and a step signal of a multilevel inverters; wherein the switch angle determination module comprises:

a switch angle calculation module; and a switch angle correction factor module.

20. The control system of claim 19 wherein the step number determination module comprises a hysteretic controller.

21. The control system of claim 19 wherein the switch angle calculation module comprises logic configured to calculate each of a plurality of switching angles as $$\alpha_i' = \sin^{-1}\left(\left(i - \frac{1}{2}\right)\frac{V_m}{V_p}\right)$$

where $V_m$ is a discrete voltage step magnitude, $V_p$ is a peak amplitude of the target waveform, and i is an indice ranging from 1 to m, where m is a number of discrete steps.

22. The control system of claim 19 wherein the switch angle calculation module comprises logic configured to calculate each of a plurality of switching angles as $$\alpha_i' = \sin_{-1}((V_{i-1} + V_i)/2V_p)$$

where $V_i$ are $V_{i-1}$ are discrete voltage step magnitudes indexed against i, $V_p$ is a peak amplitude of the target waveform, and i is an indice ranging from 1 to m, where m is a number of discrete steps.

23. The control system of claim 19 wherein the switch angle determination module further comprises:

a proportional integral voltage regulator.

24. The control system of claim 19 wherein the switch angle determination module further comprises:

a fundamental peak value determination unit comprising logic configured to calculate a peak amplitude of the fundamental frequency component waveform as $$b_1 = \frac{4V_m}{\pi}\sum_{i=1}^{m}\cos\alpha_i$$

where $V_m$ is a discrete voltage step magnitude, and i is an indice ranging from 1 to m, where m is a number of discrete steps.

25. The control system of claim 19, further comprising:

a power-related device wherein the control system is integrated with the power-related device.

26. A multilevel inverter control system, the control system comprising:

a switch angle determination module comprising logic configured to substantially minimize an area difference between a target waveform and a step signal of a multilevel inverter wherein the switch angle determination module comprises:

a switch angle calculation module; and a switch angle correction factor module.

27. The control system of claim 26 wherein the switch angle calculation module comprises logic configured to calculate each of a plurality of switching angles as $$\alpha_i' = \sin^{-1}\left(\left(i - \frac{1}{2}\right)\frac{V_m}{V_p}\right)$$

where $V_m$ is a discrete voltage step magnitude, $V_P$ is a peak amplitude of the target waveform, and i is an indice ranging from 1 to m, where m is a number of discrete steps.

28. The control system of claim 26 wherein the switch angle calculation module comprises logic configured to calculate each of a plurality of switching angles as $$\alpha_i' = \sin_{-1}((V_{i-1} + V_i)/2V_p)$$

where $V_i$ are $V_{i-1}$ are discrete voltage step magnitudes indexed against i, $V_p$ is a peak amplitude of the target waveform, and i is an indice ranging from 1 to m, where m is a number of discrete steps.

29. The control system of claim 26, farther comprising:

a power-related device wherein the control system is integrated with the power-related device.

* * * * *

UNITED STATES PATENT AND TRADEMARK OFFICE
CERTIFICATE OF CORRECTION

PATENT NO. : 6,867,987 B2
DATED : March 15, 2005
INVENTOR(S) : Bing Cheng et al.

It is certified that error appears in the above-identified patent and that said Letters Patent is hereby corrected as shown below:

Column 10,
Line 50, "$\alpha_i' = \sin_{-1}((V_{i-1} + V_i)/2V_p)$" should read as -- $\alpha_i' = \sin^{-1}((V_{i-1} + V_i)/2V_p)$ --.

Column 12,
Line 4, "$\alpha_i' = \sin_{-1}((V_{i-1} + V_i)/2V_p)$" should read as -- $\alpha_i' = \sin^{-1}((V_{i-1} + V_i)/2V_p)$ --.
Line 61, "inverters" should read as -- inverter --.

Column 13,
Line 17, "$\alpha_i' = \sin_{-1}((V_{i-1} + V_i)/2V_p)$" should read as -- $\alpha_i' = \sin^{-1}((V_{i-1} + V_i)/2V_p)$ --.

Column 14,
Line 30, "$\alpha_i' = \sin_{-1}((V_{i-1} + V_i)/2V_p)$" should read as -- $\alpha_i' = \sin^{-1}((V_{i-1} + V_i)/2V_p)$ --.

Signed and Sealed this

Thirtieth Day of August, 2005

JON W. DUDAS
*Director of the United States Patent and Trademark Office*